Figure 1:
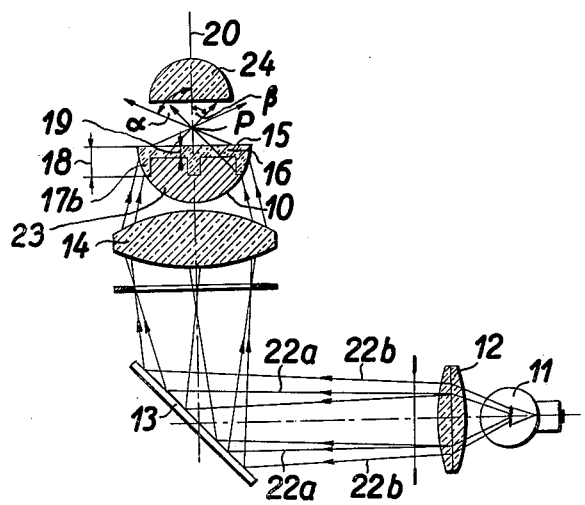

Feb. 26, 1963   J. BARABAS ET AL   3,078,764
CONDENSER FOR INCREASING THE RESOLVING POWER OF
MICROSCOPES USING TRANSMITTED LIGHT
Filed June 2, 1958

INVENTORS:
JANOS BARABAS
LASZLO ZSELYONKA
FERENC KISS
ALBERT LIBIK

BY Robert H. Jacob
AGENT

United States Patent Office 3,078,764
Patented Feb. 26, 1963

3,078,764
CONDENSER FOR INCREASING THE RESOLVING POWER OF MICROSCOPES USING TRANSMITTED LIGHT
János Barabás, 32 Hamzsabegi ut, Budapest II, Hungary; László Zselyonka, 74 Baross utca, Budapest VIII, Hungary; Ferenc Kiss, 87/c Ady Endre ut, Budapest XXII, Hungary; and Albert Libik, 23 Szekely Bertalan u., Budapest VI, Hungary
Filed June 2, 1958, Ser. No. 739,026
Claims priority, application Hungary Dec. 13, 1957
3 Claims. (Cl. 88—40)

The present invention relates to microscopes of the type using transmitted light, and it is particularly concerned with increasing the resolving power of such microscopes.

More in particular the present invention relates to a condenser for increasing the resolving power of microscopes using permeating light.

It is known that the plasticity of microscopic images can be increased in various manners. One way of doing this is to screen out the illuminating rays in the vicinity of the condenser iris by means of a diaphragm of crescent or annular shape. The annular light stop, designated as central diaphragm, eliminates, for instance, central rays of small angular aperture, thus increasing the plasticity of the image. Also the oblique illumination tends to increase the plasticity. This can be achieved by an eccentric focusing of a mirror in the lighting system or of the condenser lens. However, it is also possible to replace a diaphragm having, for example, annular shape or in the form of a ring sector underneath the condenser. However, when it is intended to achieve the maximum plasticity of the microscopic image, very considerable optical illusions take place because of the so-called azimuthal effect and the image becomes unnatural and distorted. Also the known adjusting for maximum plasticity cannot provide a field of view that is uniform and has a high intensity of illumination.

It is an object of the present invention to eliminate the aforementioned difficulties and thereby get increase of the resolving power of microscopes. The invention is based on the discovery that we can achieve a plasticity surpassing that possible heretofore with a simultaneous increase in illumination and hardly discernible distortion of the microscopic image without optical illusions, if black ground or dark-field illumination and bright-field illumination obtained by means of oblique rays are employed simultaneously.

The dark-field illumination causes the object to be examined to be illuminated by beams of light whose angular aperture is greater than that corresponding to the focal aperture of the objective lens of the microscope which contains a condenser. In this manner the edges of details of small dimensions of the object to be examined are made visible. By contrast, the bright-field illumination by means of oblique rays indicates that even such light rays penetrate the front lens of the condenser, whose aperture angle attains at the most the angular value corresponding to the aperture of the objective lens of a microscope containing the condenser. These direct beams of light produce shadow effects, thus greatly increasing the plasticity of the microscopic image as well as the resolving power of the microscope, while at the same time greatly decreasing the distortion of the image. As a result of the direct beams of light, the edges and other minute details of the object to be examined which are disposed in the shadow become self-illuminating in a manner known per se and thus appear brighter.

Both the dark-field illumination as well as the bright-field illumination by means of oblique rays can be effected from one direction. Both these directions may even be identical. The dark-field illumination from a single direction becomes especially important when the condenser is intended for microscopes in which it is to be placed at right angles to its optical axis. It is also possible, however, to use both types of illumination from several directions. Here, the dark-field illumination can also be arranged from all directions, while the bright-field illumination by means of oblique rays should suitably not be effected from more than four directions because then its advantageous effectiveness decreases. The directions of illumination may form any desired angle with each other. It is of advantage, however, to effect both the dark-field illumination as well as the bright-field illumination in opposite directions, with the dark-field illumination coming from more directions than the bright-field illumination by means of oblique beams of light.

Accordingly the invention provides a condenser wherein the object point of the optical system in accordance with the invention as determined by the condenser a dark-field illumination from at least one direction is present simultaneously with a bright-field illumination by means of oblique rays.

Figure 2:
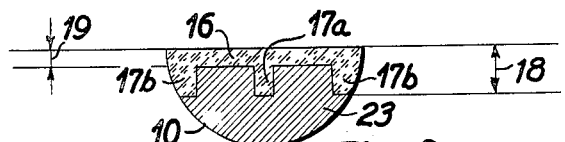
Figure 3:
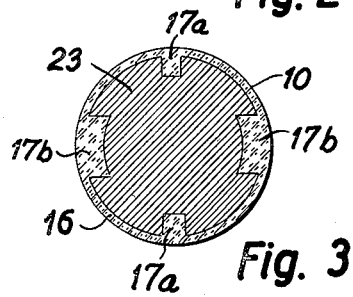

Other objects and details of the invention will become apparent from the following specification explaining the embodiments illustrated in the drawings in which:

FIG. 1 is a schematic illustration of a condenser with mirror and light source in accordance with the invention, FIG. 2 is a side view of the condenser lens of another embodiment, and FIG. 3 is a bottom view of FIG. 2.

In the embodiment in accordance with FIG. 1, the condenser has a hemispherical front lens 10 which is being reached by beams of light from a light source 11 in a known manner by way of convergent lens 12, a mirror 13 and a convex lens 14. For the purpose of dark-field illumination in object point P of the optical system 10 to 14 defined by the condenser, the front lens 10 of the condenser has a light-transmitting spherical zone 16 adjacent to the outlet surface 15 of front lens 10, while for the purpose of bright-field illumination by means of oblique rays, spherical zone segments or windows 17a and 17b of different length are provided adjacent to the spherical zone 16 whose width 18 is greater than the width 19 of spherical zone 16. Otherwise the spherical light receiving surface 23 of the lens 10 is opaque so as to intercept central light rays.

In the illustrated embodiment pairs of spherical zone segments 17a and 17b are provided which are diametrally opposed and of the same length. As mentioned above, it would also be feasible to provide only one spherical zone segment 17a or 17b. It is also possible, when there are several spherical zone segments 17a or 17b, to vary their width 18 as well as their length or shape. For example, the windows 17a and 17b can have a shape other than rectangular spherical surface, in which case the width or length of the spherical zone segments or light stops are understood to have their greatest dimensions in the meridional or equatorial direction. This provides a further possibility for taking into consideration the characteristics of the plastic image we desire to obtain. The length of the spherical zone segments will suitably be of different size when the condenser is intended for microscopes whose condenser is not placed at right angles to its optical axis 20.

The width 19 of the spherical zone surface 16 will be chosen in a manner to create in object point P an illumination corresponding to the dark-field illumination. This means that beams of light 22a of light source 11, after leaving front lens 10, have an angular aperture α that is greater than that of the angular aperture corresponding to the focal aperture of objective lens 24 of a microscope that contains a condenser. By contrast, rays of light 22b that are permitted to pass by the thicker spherical zone segments or windows 17a, 17b, have an aperture angle β that is smaller than the angular aperture corresponding to the focal aperture of objective lens 24. Consequently, a dark-field illumination is created circumferentially of object point P and in the center a bright-field illumination by direct oblique light rays coming from two directions, thus providing a simultaneously illuminated plastic image.

In principle it is unimportant that the dark-field illumination in the areas of the windows 17a, 17b becomes practically imperceptible because of the additional bright-field illumination occurring at these points. Actually, at these points dark-field illumination rays and oblique bright-field illumination rays are present simultaneously adjacent to each other.

The embodiment illustrated presents a condenser having more than one spherical zone segment 17a or 17b arranged in pairs which are diametrically opposite. The embodiment in accordance with FIGS. 2 and 3 has two such pairs with the length of windows 17a and 17b being different for each pair.

The light intercepting portions of front lens 10 will be obtained here by the blackening of the corresponding surface of the lens.

The embodiment illustrated shows a front lens 10 whose dark-field illumination is effected by surface parts of the lens having zones of spherical shape. These continuous spherical zones provide in some places the larger segments or windows 17b which practically interrupt the spherical zones proper, since in these places the dark-field illumination does not actually appear. Evidently it also would be possible to eliminate the dark-field illumination in these spots, or also to interrupt the spherical zones in several places.

It must be added that the brightening of the image can be enhanced by dulling the glass of the object slide. This provides a uniformly diffused light which adds to the uniformity of the illumination of the datum plane of the object to be examined.

Having now described our invention with reference to the embodiments illustrated, we do not wish to be limited thereto, but what we desire to protect by Letters Patent of the United States is set forth in the appended claims.

We claim:
1. An optical system comprising a condenser for increasing the resolving power of microscopes operating with transmitted light and having a light source, said condenser comprising a lens having a flat transparent light emergence surface and a hemispherical light receiving surface, said light receiving surface presenting an opaque central spherical zone preventing the penetration of light to the central area of said flat light emergence surface, a transparent equatorial spherical zone extending over a given thickness of said lens from said emergence surface to said opaque zone and providing a circular area of dark field illumination in said light emergence surface and a plurality of transparent spherical zones extending from said equatorial zone over an additional part of the thickness of said lens defining transparent windows of spherical surface area for transmitting oblique light rays providing zones of bright field illumination within said circular area of dark field illumination.

2. An optical system comprising a condenser for increasing the resolving power of microscopes operating with transmitted light and having a light source, said condenser comprising a lens having a flat transparent light emergence surface and a hemispherical light receiving surface, said light receiving surface presenting an opaque central spherical zone preventing the penetration of light to the central area of said flat light emergence surface, a transparent equatorial spherical zone extending over a given thickness of said lens from said emergence surface to said opaque zone and providing a circular area of dark field illumination in said light emergence surface and a plurality of transparent spherical zones extending from said equatorial zone over an additional part of the thickness of said lens defining transparent windows of spherical surface area for transmitting oblique light rays providing zones of bright field illumination within said circular area of dark field illumination, said equatorial spherical zone extending from said light emergence surface toward said light receiving surface in the direction of the optical axis of the microscope and said transparent windows being separated by portions of said opaque spherical central zone.

3. An optical system comprising a condenser for increasing the resolving power of microscopes operating with transmitted light and having a light source, said condenser comprising a lens having a flat transparent light emergence surface and a hemispherical light receiving surface, said light receiving surface presenting an opaque central spherical zone preventing the penetration of light to the central area of said flat light emergence surface, a transparent equatorial spherical zone extending over a given thickness of said lens from said emergence surface to said opaque zone and providing a circular area of dark field illumination in said light emergence surface and a plurality of transparent spherical zones extending from said equatorial zone over an additional part of the thickness of said lens defining transparent windows of spherical surface area for transmitting oblique light rays providing zones of bright field illumination within said circular area of dark field illumination, said equatorial spherical zone extending from said light emergence surface toward said light receiving surface in the direction of the optical axis of the microscope and said transparent windows being separated by portions of said opaque spherical central zone, and being arranged in pairs disposed diametrically opposite each other and said pairs being of different width circumferentially of said light emergence surface.

References Cited in the file of this patent

UNITED STATES PATENTS

| | | |
|---|---|---|
| 2,182,499 | Ott | Dec. 5, 1939 |
| 2,415,732 | Domingo | Feb. 11, 1947 |

FOREIGN PATENTS

| | | |
|---|---|---|
| 436,595 | Germany | Nov. 4, 1926 |